United States Patent
Shazly

(10) Patent No.: US 9,110,907 B2
(45) Date of Patent: Aug. 18, 2015

(54) FRAMEWORK FOR EXTREMELY LARGE COMPLEX OBJECTS (XLCOS)

(75) Inventor: Hassan A. Shazly, Columbia, SC (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 12/894,013

(22) Filed: Sep. 29, 2010

(65) Prior Publication Data

US 2012/0078930 A1      Mar. 29, 2012

(51) Int. Cl.
*G06F 7/00* (2006.01)
*G06F 17/30* (2006.01)

(52) U.S. Cl.
CPC .... *G06F 17/30091* (2013.01); *G06F 17/30318* (2013.01)

(58) Field of Classification Search
CPC .............. G06F 17/30076; G06F 17/30289; G06F 17/30569
USPC ........................................................ 707/756
See application file for complete search history.

(56) References Cited

U.S. PATENT DOCUMENTS

| | | | | |
|---|---|---|---|---|
| 4,694,404 A * | 9/1987 | Meagher | ...................... | 345/421 |
| 5,754,841 A | 5/1998 | Carino, Jr. | | |
| 5,864,843 A | 1/1999 | Carino, Jr. et al. | | |
| 6,079,047 A * | 6/2000 | Cotugno et al. | .............. | 714/807 |
| 6,085,266 A * | 7/2000 | Cotugno | ......................... | 710/68 |
| 6,343,286 B1 | 1/2002 | Lee et al. | | |
| 6,606,617 B1 | 8/2003 | Bonner et al. | | |
| 6,651,072 B1 | 11/2003 | Carino, Jr. et al. | | |
| 6,665,772 B1 * | 12/2003 | Hamlin | ........................ | 711/112 |
| 6,741,744 B1 * | 5/2004 | Hsu | ................................ | 382/229 |
| 7,333,713 B1 * | 2/2008 | Ito et al. | ......................... | 386/239 |
| 2002/0143979 A1 * | 10/2002 | Douceur et al. | ............ | 709/231 |
| 2002/0156840 A1 * | 10/2002 | Ulrich et al. | ................... | 709/203 |
| 2004/0078568 A1 * | 4/2004 | Pham et al. | .................... | 713/165 |
| 2009/0235041 A1 * | 9/2009 | Harris | ........................... | 711/170 |
| 2009/0307241 A1 * | 12/2009 | Schimunek et al. | .......... | 707/100 |
| 2010/0088315 A1 * | 4/2010 | Netz et al. | ..................... | 707/737 |

OTHER PUBLICATIONS

Babu, S., L. Subramanian, and J. Widom, "A Data Stream Management System for Network Traffic Management", In Proceedings of Workshop on Network-Related Data Management, 2001, 2 pp. (Also available at: http://ilpubs.stanford.edu:8090/493.).

Bruni, P., P. Becker, T. Bohlsen, B. Diekmann, D. Etkin, and D. Goehals, "LOBs with DB2 for z/OS: Stronger and Faster", IBM Redbooks, First Edition, Nov. 2006, 306 pp.

Burleson, D.K., D. Ensor, C. Foot, L. Hernandez, M. Hordila, J. Lewis, D. Moore, A. Nanda, and J. Weeg, "Oracle Space Management Handbook", © 2003 BMC Software and DBAZine, 311 pp.

(Continued)

*Primary Examiner* — Mark E Hershley
(74) *Attorney, Agent, or Firm* — Janaki K. Davda; Konrad, Raynes, Davda & Victor LLP

(57) ABSTRACT

Provided are techniques for receiving multiple data streams having different data formats. The multiple data streams are converted into an Extremely Large Complex Object (XLCO) file by forming multiple XLCO segments corresponding to the multiple data streams, wherein different data formats are stored in different XLCO segments, and wherein different XLCO segments are different sizes. The XLCO segments of the XLCO are stored in different physical file systems having different operating systems.

24 Claims, 15 Drawing Sheets

(56) References Cited

OTHER PUBLICATIONS

Campbell, D. and A. Nori, "The Microsoft Data Platform", In Proceedings of the 2007 ACM SIGMOD International Conference on Management of Data, Jun. 2007, 8 pp.
Girod, L., Y. Mei, R. Newton, S. Rost, A. Thiagarajan, H. Balakrishnan, and S. Madden, "XStream: A Signal-Oriented Data Stream Management System", In Proceedings of the International Conference on Data Engineering, 2008, 10 pp. (Also available at: http://people.csail.mit.edu/newton/xstream-icde08.pdf.).
Halverson, A., V. Josifovski, G. Lohman, H. Pirahesh, and M. Morschel, "ROX: Relational Over XML", In Proceedings of the 30th VLDB Conference, 2004, 12 pp.
Jaeger, A., "A.4. Large File Support in Linux", [online] Feb. 15, 2005, [Retrieved on Aug. 30, 2010], SuSE GmbH (now Novell, Inc.), SUSE LINUX—Administration Guide, Retrieved from the Internet at <URL: http://www.novell.com/documentation.suse91/suselinux-adminguide/html/apas04.html>, 2 pp.
Schmuck, F., and R. Haskin, "GPFS: A Shared-Disk File System for Large Computing Clusters", In Proceedings of the Conference on File and Storage Technologies, Jan. 2002, 14 pp. (Also available at: http://www.almaden.ibm.com/StorageSystems/projects/gpfs/Fast02.pdf.).
Solaris OS Group, "Large Files in Solaris: A White Paper", Mar. 1996, Revision 1, © Sun Microsystems, Inc., 35 pp. (Also available at: http://www.sun.com/software/whitepapers/wp-largefiles/largefiles.pdf.).
Wikipedia, "Comparison of File Systems", [online], last modified Aug. 16, 2010, [Retrieved on Aug. 30, 2010], retrieved from the Internet at <URL: http://en.wikipedia.org/wiki/Comparison_of_file_systems>, 25 pp.
Wood, C., "Client/Server Data Serving for High Performance Computing", In Proceedings of the NASA Goddard Conference on Mass Storage Systems and Technologies, 1995, 17 pp. (Also available at: Proceedings of the Fourteenth IEEE Symposium on Mass Storage Systems, 1995.).
X/Open Base Working Group, "Adding Large File Support to the Single UNIX Specification", [online] Last Update Aug. 14, 1996, [Retrieved on Aug. 30, 2010], retrieved from the Internet at <URL: http://opengroup.org/platform/lfs.html>, 14 pp.
Lawson, S. "DB2 Data Sharing as the High Performance Server for E-Business," DB2 Performance Journal, vol. 1, No. 3, Nov. 2000): pp. 78-98. [Also Total 21 pp.].

\* cited by examiner

900

To open a new XLCO file
openFileNew (XLCO FileServerName, FileStore, newXLCOFileName, maxSegSize......)

To open an existing XLCO file
openFile(XLCO FileServerName, FileStore, XLCOFileName, .....)

To close an XLCO file (and all open XLCO segments belonging to the XLCO file)
closeFile(XLCOFileName)

To delete an XLCO file and all XLCO segments belonging to the XLCO file.
deleteFile(XLCOFileName)

To rename an XLCO file
renameFile(oldXLCOFileName, newXLCOFileName)

To read from an XLCO file
readByte(byte [], fileOffset, numBytes, arrayOffset,....)

where
- fileOffset is the offset from the current file pointer location to start reading from.
- fileOffset may be a negative or positive number.
- numBytes are the number of bytes to be copied from the file to the array.
- arrayOffset is the location in the array to start writing the bytes to.
- The filepointer points to the beginning of the XLCO file for the first read. The filepointer is continuously incremented as reading or writing progresses throughout the XLCO file (spanning multiple XLCO segments). The application issuing the read is unaware of the underlying XLCO segment structure.
- If autoSequence is set to "Y", then the XLCO segments are opened in sequence according to the fileSequence number, otherwise if autoSequence is set to "N" then the XLCO segments are opened in the fileSegRow, fileSegCol order (e.g., fileSegRow =1,fileSegCol=1... fileSegRow =1, fileSegCol=2......... fileSegRow =2, fileSegCol=1.. fileSegRow =2, fileSegCol=2....)

> To write to an XLCO file
> writeByte(byte [], arrayOffset, numBytes, fileOffset)
>
> where
> - arrayOffset is the location in the array to start reading the bytes from.
> - fileOffset may be a negative or positive number.
> - numBytes are the number of bytes to be copied from the array to the file.
> - fileOffset is the offset from the current file pointer location to start writing to.
> - When the number of bytes written to an XLCO segment exceeds the maxSegSize, a new XLCO segment is automatically created, the additional bytes are written to the new XLCO segment, and AutoSequencing is set to "Y".
>
> To append to an XLCO file
> appendByte(byte [], arrayOffset, numBytes)
> The writeByte function is executed with the fileOffset value set to the number of the bytes in the file plus one.
>
> To update an XLCO file, the writeByte function is executed with the fileOffset value set to the location at which bytes are to be overwritten.
>
> To delete bytes from an XLCO file
> deleteByte(numBytes, fileOffset)
> The number of bytes to be deleted along with the starting fileOffset from which bytes are to be deleted from, are specified. The XLCO segment containing those bytes will be read until the fileOffset location, then the numBytes to be deleted will be skipped and the rest of the segment will then be read. A new XLCO segment will be stored to disk (containg only those bytes that were not to be deleted) and the original XLCO segment will then be deleted after which the XLCO metadata will be updated appropriately). The deleteByte function may span multiple XLCO segments depending on the XLCO segment size and the numBytes to be deleted.

FIG. 10B readByteP(byte [], fileOffset, numBytes, arrayOffset,....fileSegRow , fileSegCol )

writeByteP(byte [], arrayOffset, numBytes, fileOffset,....fileSegRow , fileSegCol )

readByteS(byte [], fileOffset, numBytes, arrayOffset,....fileSequence )

writeByteS(byte [], arrayOffset, numBytes, fileOffset,....fileSequence )

- When the number of bytes written to an XLCO segment exceeds the maxSegSize, no more bytes can be written to the XLCO segment and the application calls createFileSeg to create a new XLCO segment before continuing to write data to the new XLCO segment.
- The fileOffset is the offset into the XLCO segment.

To append to an XLCO file segment
appendByteP(byte [], arrayOffset, numBytes, fileOffset,....fileSegRow , fileSegCol )
appendBytesS(byte [], arrayOffset, numBytes, fileOffset,....fileSequence )
The writeByte function is executed with the fileOffset value set to the number of the bytes in the XLCO segment plus one.

To update an XLCO segment, the writeByte function is executed with the fileOffset value set to the location in the XLCO segment at which bytes are to be overwritten.

To delete bytes from an XLCO segment
deleteByteP(numBytes, fileOffset,....fileSegRow, fileSegCol )
deleteBytesS(numBytes, fileOffset,....fileSequence )
The number of bytes to be deleted along with the starting fileOffset from which bytes are to be deleted from, are specified.
The XLCO segment containg those bytes will be read until the fileOffset location, then the numBytes to be deleted will be skipped and the rest of the segment will then be read. A new XLCO segment will be stored to disk (containg only those bytes that were not to be deleted) and the original XLCO segment will then be deleted after which the XLCO metadata will be updated appropriately).

FIG. 11

1200 createFileSeg: creates a new XLCO file segment.
- Sets fileSegRow and fileSegCol, and
- If autoSequence is set to "N", sets the fileSequence.

The createFileSeg physically links the newly created segment to the XLCO by setting the XLCO file segment part "externalXLOFilename" to the same value as the "externalXLCOFilename" in the XLCO File Header.
createFileSeg allows for the newly created segment to be logically linked/placed anywhere within the XLCO construct. The new segment can be appended to the XLCO file by incrementing the fileSegRow and/or fileSegCol or by incrementing the fileSequence number as appropriate, depending upon the specific implementation. Alternatively, the new segment can be inserted into the XLCO file by setting the required fileSegRow, fileSegCol and/or fileSequence values then auto incrementing the values that follow the set value.

deleteFileSeg: deletes an existing XLCO segment setFileSequence: sets (resets) the fileSequence number of the XLCO segments. This allows for re-ordering the sequence with which XLCO segments may be retrieved.

FIG. 12

FRAMEWORK FOR EXTREMELY LARGE COMPLEX OBJECTS (XLCOS)

BACKGROUND

1. Field

Embodiments of the invention relate to a framework for Extremely Large Complex Objects (XLCOs).

2. Description of the Related Art

FIG. 1 illustrates, in a block diagram, normal file system access in the prior art. In FIG. 1, application code 100 of an application is accessing a "normal" file system 120. In FIG. 1, the application code 100 (e.g., written in the C programming language or other programming language) includes a file access request. That is, the file access request is embedded in the application code 100. It may also be said that the application code 100 utilizes a language specific file access method to interface with the underlying Operating System file system in order to perform file access. Generally, there are Open and Close file routines between which a variety of data Read and Write routines are executed. For example, the file access request may be OpenFile(filename) or getBytes(file-Handle, startLocation, numBytes). The file access request is issued to an Operating System (OS)/file system 120, which executes the file access request against disk 122. That is, the OS Input/Output (I/O) subsystem handles the actual reading and writing of data to the disk 122.

Over the years, computer applications have grown in both size and complexity. Older applications typically accessed datasets composed of flat files. These datasets were small in size and could be processed using a few Central Processing Unit (CPU) cycles and a limited amount of memory. Modern application requirements demand more storage, processing, and memory requirements. These modern applications perform functions, such as document processing, report archiving, and processing of image, video and voice. As applications become more advanced, there is a need to combine data formats (also referred to as data types) of multiple types into a single file.

The ability to process extremely large files is constrained by file system limitations or the processing program limitations, whichever is the smaller. Current file system limitations are typically in the multiple Gigabyte (Gbyte) range, while program processing limitations are often constrained to the amount of data that can be held in memory at one time, typically in the single Gbyte range.

The need for even more data storage and processing capacity will continue to grow as larger datasets (e.g., from multi-dimensional, multi-formatted, time variant and data-streaming applications) start to take hold. An example of a data-streaming problem is: "How do you store video data from all the video sources in a city and how can this data later be efficiently searched using image recognition software to identify and track a specific individual?". A current solution to this problem is to process the video data as the video data is being captured and, then, to either discard the video data or store a subset of the total video data stream. This may or may not be sufficient depending on the nature of the problem at hand. In the above example, if one is tracking an individual in real time, then it is sufficient to know where the person is and to "guess" as to where the person is going. On the other hand, if one is trying to back track an individual's movement over time, then this is not possible unless the data has been stored somewhere in a fashion that allows the data to be retrieved and processed efficiently.

Current general solutions to the large file problem involves taking advantage of multiple computer system enhancements:

1. Increasing the number of bits used by the OS to determine file sizes.
2. Increasing the number of available processors (number of processors and number of CPUs within a processor) contained within a computer system.
3. Increasing the amount of memory available to the computer system.

These computer system enhancements, while providing improvements in computer storage and processing capacity are incapable of providing a general solution to the problem due to a number of shortcomings.

With reference to increasing the number of bits used by the OS to determine file sizes, there are a number of shortcomings. For example, there may be a need to store a file larger than the existing file size limit. Historically, this has been true and there is no reason to believe that this will not be true in the foreseeable future. Also, not all files need to be extremely large. Many files are in the Kilobyte (Kbyte) or Megabyte (Mbyte) size by nature of their content. So using large numbers of bits to determine the file size imposes file system penalties for the smaller files. In addition, users will have to purchase "newer" OSs and the computer systems they run on in order to support the larger file sizes. Moreover, in conventional systems, these large files can only contain a single data format. Also, the file size is limited by the size of the physical storage device. Furthermore, it would be hard to create "larger systems/processing complexes" composed of multiple systems if all of the multiple systems do not support the same OS constraints.

With reference to increasing the number of available processors contained within the computer system, there are a number of shortcomings. For example, to take advantage of multiple processor systems, the OS must support multiprocessor processing, either in the form of multi-threading or a specialty language that allow an application to address large numbers of processors (sometimes referred to as "cores") directly. Also, the disadvantage of the specialty languages is that the applications become very system dependant and, thus, hard and expensive to maintain. Moreover, the disadvantage of multi-threading is that it is not scalable across multiple computer systems. In addition, the file cannot be processed by multiple threads or multiple applications (on different systems) in parallel.

With reference to increasing the amount of memory available to the computer system, there are a number of shortcomings. For example, there will always be a need for more real memory in a system. Also, processing of a large file cannot be spread over multiple systems.

BRIEF SUMMARY

Provided are a method, computer program product, and system for receiving multiple data streams having different data formats. The multiple data streams are converted into an Extremely Large Complex Object (XLCO) file by forming multiple XLCO segments corresponding to the multiple data streams, wherein different data formats are stored in different XLCO segments, and wherein different XLCO segments are different sizes. The XLCO segments of the XLCO are stored in different physical file systems having different operating systems.

BRIEF DESCRIPTION OF THE SEVERAL VIEWS OF THE DRAWINGS

Referring now to the drawings in which like reference numbers represent corresponding parts throughout:

FIG. 9 illustrates XLCO file level access functions in accordance with certain embodiment.

FIG. 10 illustrates sequential XLCO segment access functions in accordance with certain embodiments. FIG. 10 is formed by FIGS. 10A and 10B.

FIG. 11 illustrates direct XLCO segment access functions in accordance with certain embodiments.

FIG. 12 illustrates XLCO segment utility functions in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments provide a framework for Extremely Large Complex Objects (XLCOs) that allows for the storage of a single "virtual" XLCO file, containing multiple data formats, spread out over (i.e., spanning) one or more storage devices (e.g., disk drives) over one or more computing systems. An XLCO file may be described as being formed by different segments, and the different "segments" of the XLCO file may be processed in parallel by multiple threads on a single processor and/or multiple processes running on different computer systems.

An XLCO may be described as a virtual XLCO file that is physically composed of a collection of "small" physical files of one or more data formats, which are called XLCO segments. Each XLCO segment may range in size from one byte up to the maximum size supported by the computer system's file system and the limitations imposed by the physical file systems. In certain embodiments, the XLCO file size is determined based on the application and user requirements. Depending on data requirements, each XLCO segment may be composed of a different data format and may be of a different size. The XLCO segments may be logically grouped into a single XLCO file by means of XLCO metadata and supporting code.

Figure 1:
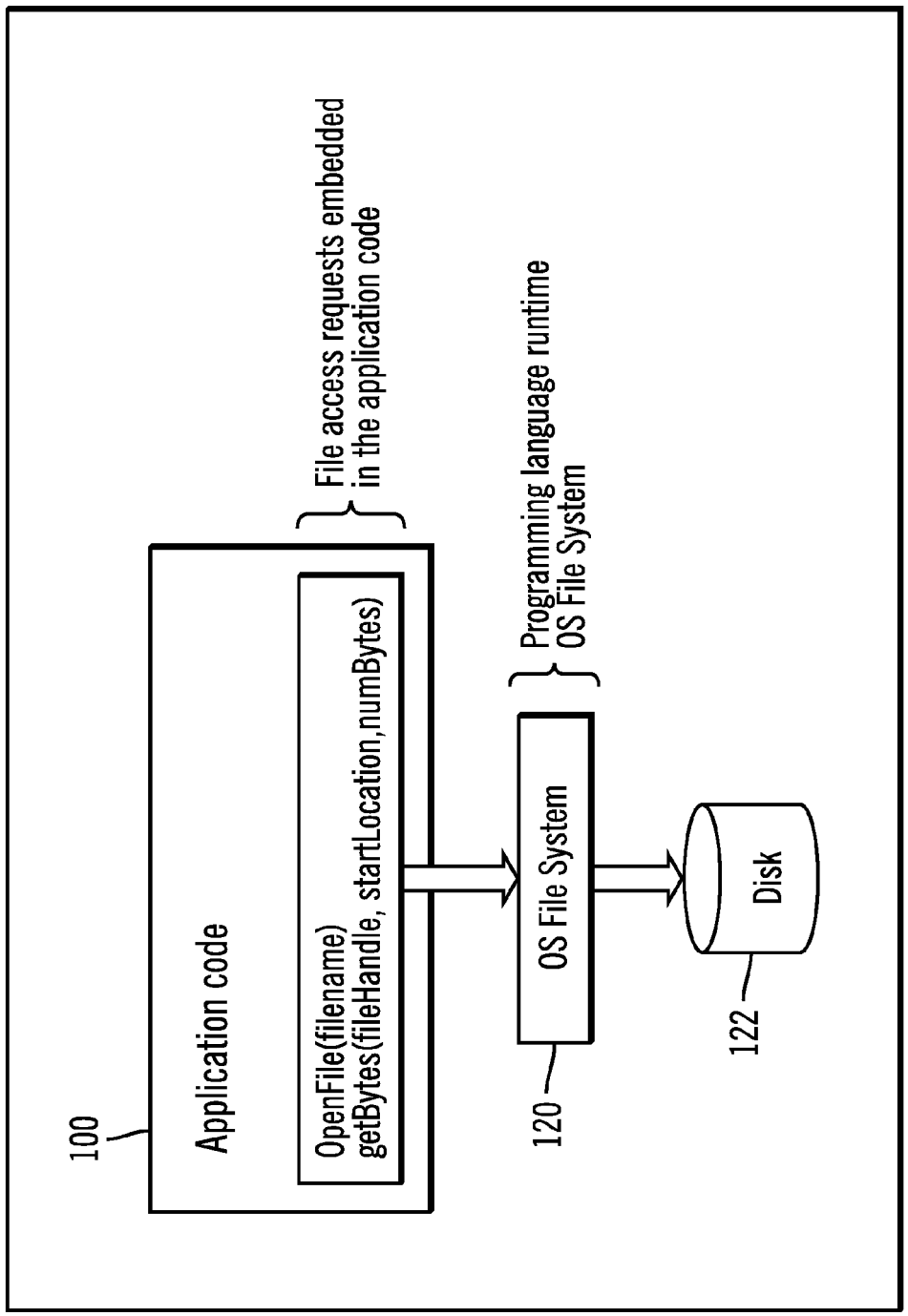
FIG. 1 illustrates, in a block diagram, normal file system access in the prior art.
Figure 2:
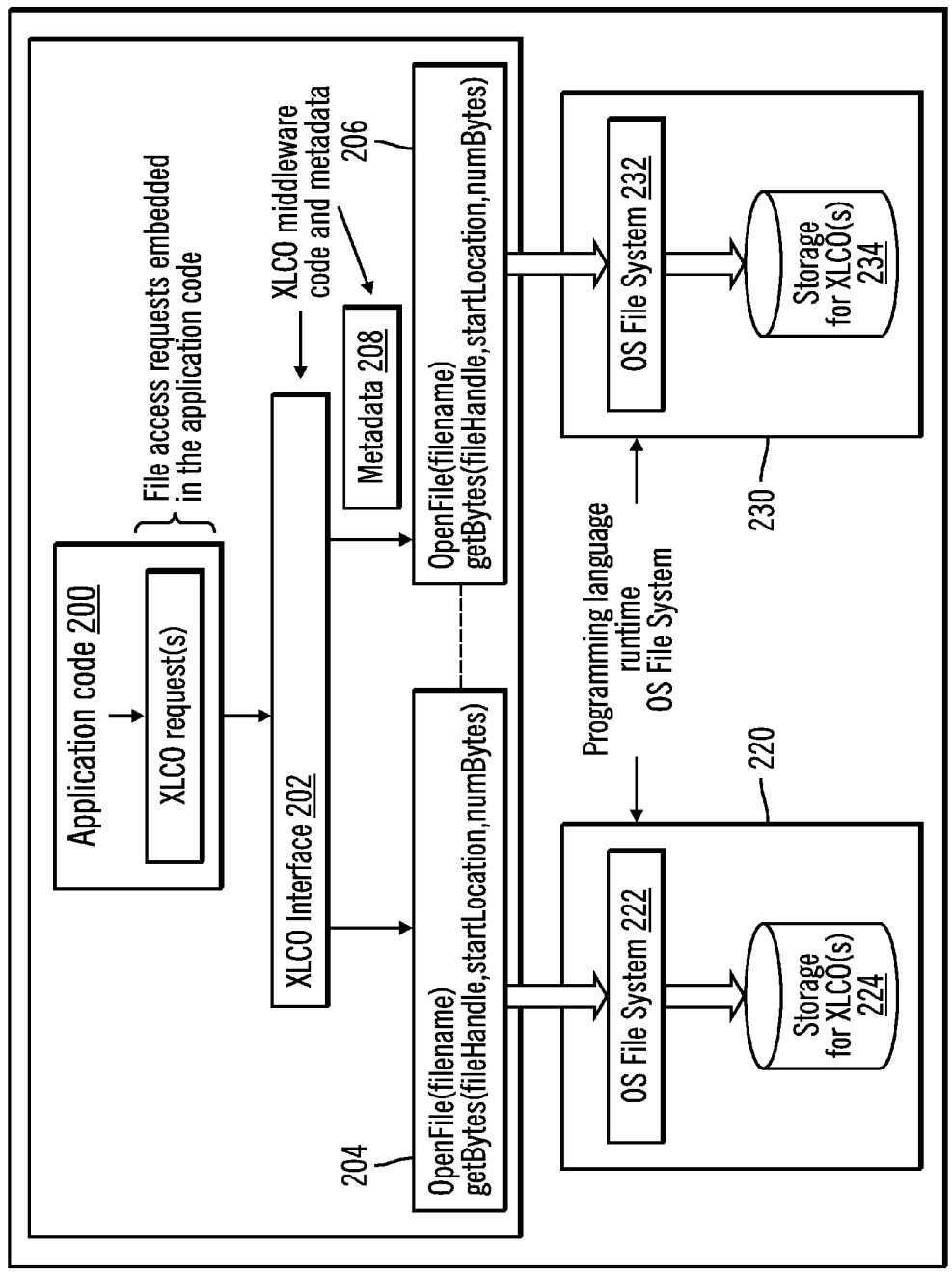
FIG. 2 illustrates, in a block diagram, a computer architecture for an XLCO file system in accordance with certain embodiments.

FIG. 2 illustrates, in a block diagram, a computer architecture for an XLCO file system in accordance with certain embodiments. In FIG. 2, application code 200 (e.g., written in the C programming language or other programming language) of an application includes one or more XLCO requests. The XCLO architecture allows multiple applications (or a distributed application or a multithreaded application) residing on one or more computer systems to access the XLCO file concurrently (illustrated in FIG. 6 and FIG. 7). The XCLO data accessed by the application code may be located at one of the computer systems 220, 230 or at a third computer system separate from computer systems 220, 230. That is, the one or more XLCO requests are embedded in the application code 200. FIGS. 8, 9, 10, 11, and 12 illustrate example XLCO requests in accordance with certain embodiments. The XLCO interface 202 receives each XLCO request and maps the XLCO request to one or more OS file system requests 204, 206 using metadata 208. The XLCO interface 202 routes the OS file system requests 204, 206 to the appropriate OS file systems 222, 232 at respective computer systems 220, 230.

Computer system 220 includes OS file system 222, which is coupled to storage 224. Computer system 230 includes OS file system 232, which is coupled to storage 234. The storage 224, 234 may be any type of device capable of storing data (e.g., disk, optical or tape). Each storage 224, 234 may store one or more XLCO files, XLCO segments, and/or non-XLCO (i.e., "normal") files.

Each OS file system 222, 232 processes received requests. The OS Input/Output (I/O) subsystem of each OS file system 222, 232 handles the actual reading and writing of the XLCO file.

For a particular, XLCO file, the segments may be distributed across different storages. Although only OS file systems 222, 232 and storages 224, 234 are illustrated, there may be any number of OS file systems or storages in various embodiments.

In certain embodiments, the XLCO file may be implemented by inserting the XLCO interface 202 between the application code 200 and each OS file system 222, 232.

In certain embodiments, the XLCO file system may be described as a "middleware code/metadata" implementation. That is, the XLCO interface 202 and metadata 208 form the middleware code and metadata, respectively. This "middleware" type of implementation allows the XLCO interface 202 and metadata 208 to control program access to the XLCO segments (i.e., physical files). This allows the XLCO interface 202 and metadata 208 to create a "virtualized" XLCO file that can span multiple devices and multiple computer systems.

The XLCO file structure allows for the storage and processing of files in the terabyte or beyond range (limited by hardware and network availability) regardless of the OS, file system or memory limitations of the computer hardware system.

The XLCO file structure allows for the XLCO file to be stored on one or more file systems, on one or more computer systems (e.g., connected via Transmission Control Protocol (TCP)/Internet Protocol (IP) (i.e., TCP/IP)) in a linear or hierarchical fashion. In certain embodiments, the XLCO file format allows for the following operations:

Parallel data storage: each XLCO segment may be stored independently of any other XLCO segment. Thus, multiple threads or processes can store multiple data input streams in parallel.

Full object retrieval. The entire XLCO file may be retrieved from beginning to end. The fact that the XLCO file may be composed of multiple XLCO segments is transparent to the application.

Partial object retrieval: The XLCO file may be retrieved in parts, either explicitly by specifying an offset and the number of bytes to retrieve or at the XLCO segment level (i.e., by retrieving an entire segment or by specifying an offset into the segment and number of bytes to retrieve).

Appending to the object: An XLCO segment may be appended to an XLCO file and/or data may be appended to a specific XLCO segment.

Deleting from the object: The entire XLCO file may be deleted or an XLCO segment may be deleted.

Inserting into the object: An entire XLCO segment may be inserted into the XLCO or data may be inserted into a single XLCO segment (e.g., using an editor or some other application).

Linking XLCO segments: XLCO segments may be logically linked in a linear or a hierarchical fashion.

For hierarchically stored XLCO segments, the following additional operations may be performed in certain embodiments: column retrieval (a series of XLCO segments), column insertion (a series of XLCO segments), column appending (a series of XLCO segments), and column deletion (a series of XLCO segments).

Linking may describe physical linking and/or logical linking, where physical linking is the linking of a new XLCO segment with an existing XLCO file and logical linking is the placement of the a XLCO segment within the construct of the existing XLCO file. In this document, if the term linking is used without specifying "physical linking" or "logical linking", then the term linking implies both physical and logical linking.

Figure 4:
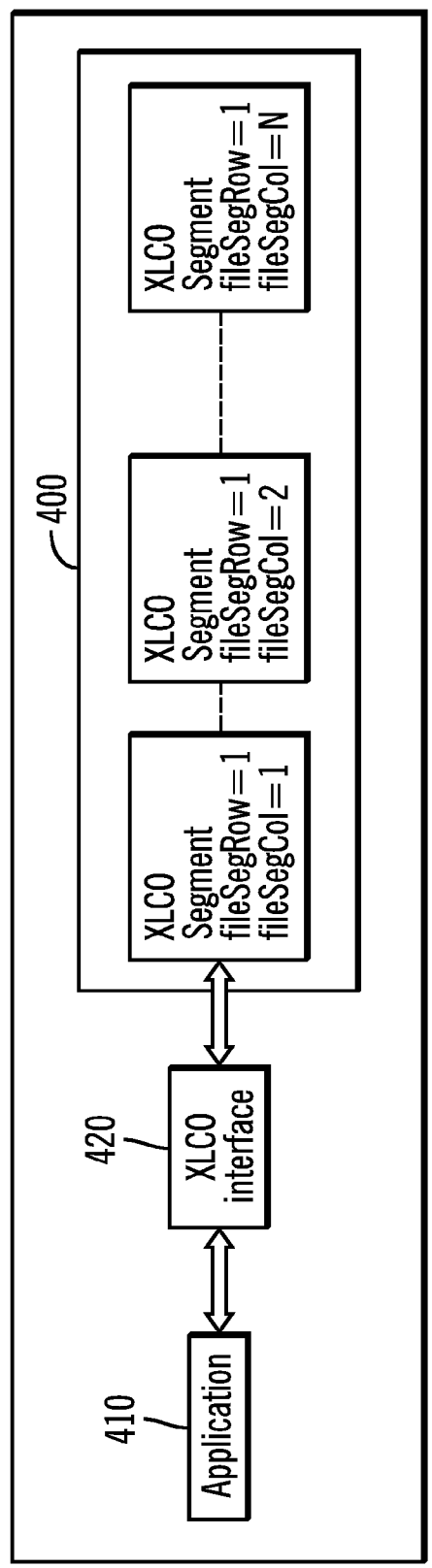
FIG. 4 illustrates, in a block diagram, an XLCO with a linear segment structure consisting of a single Row and multiple columns in accordance with certain embodiments.
Figure 5:
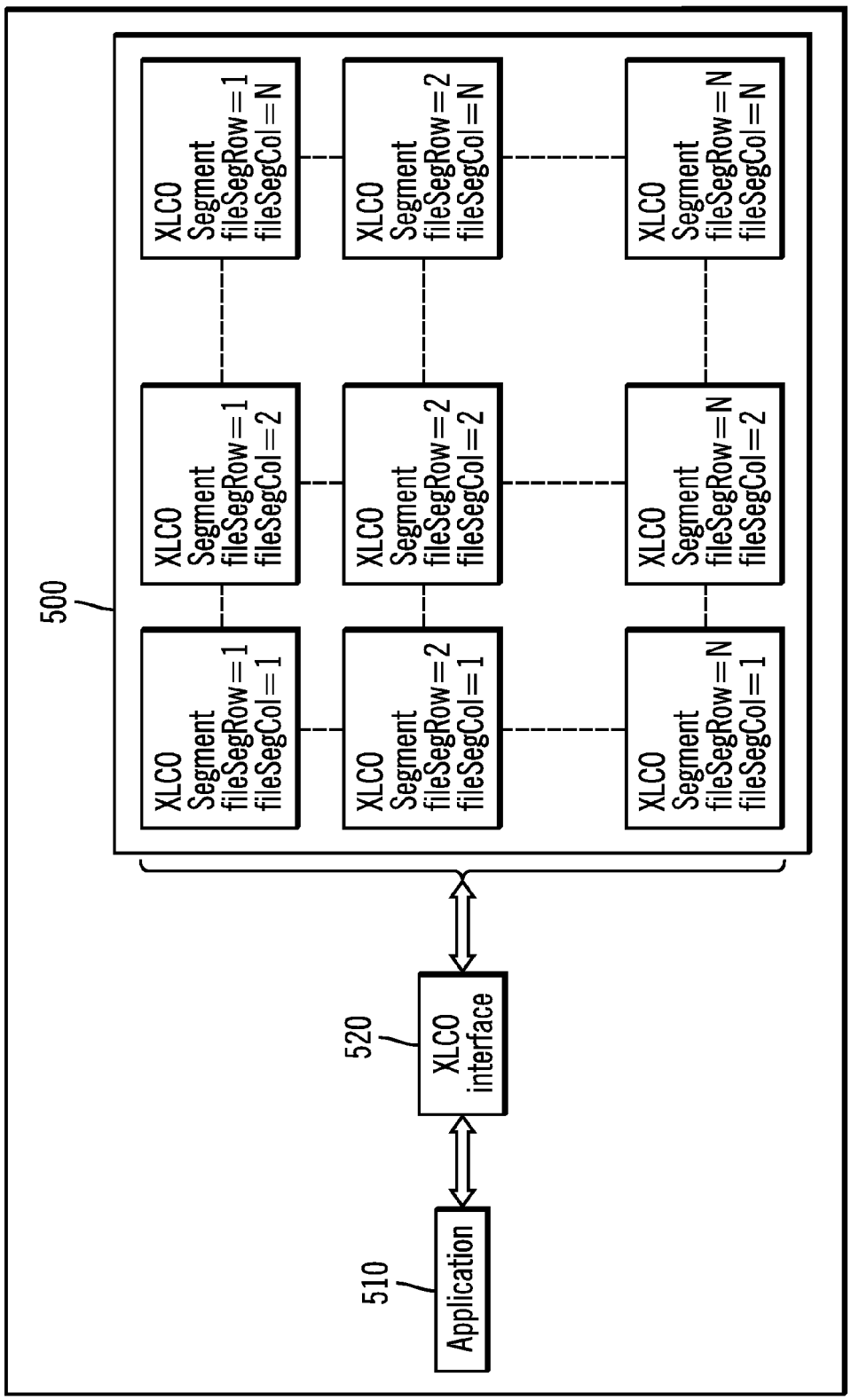
FIG. 5 illustrates, in a block diagram, an XLCO with a parallelized segment structure consisting of a multiple Rows and multiple columns in accordance with certain embodiments.
Figure 6:
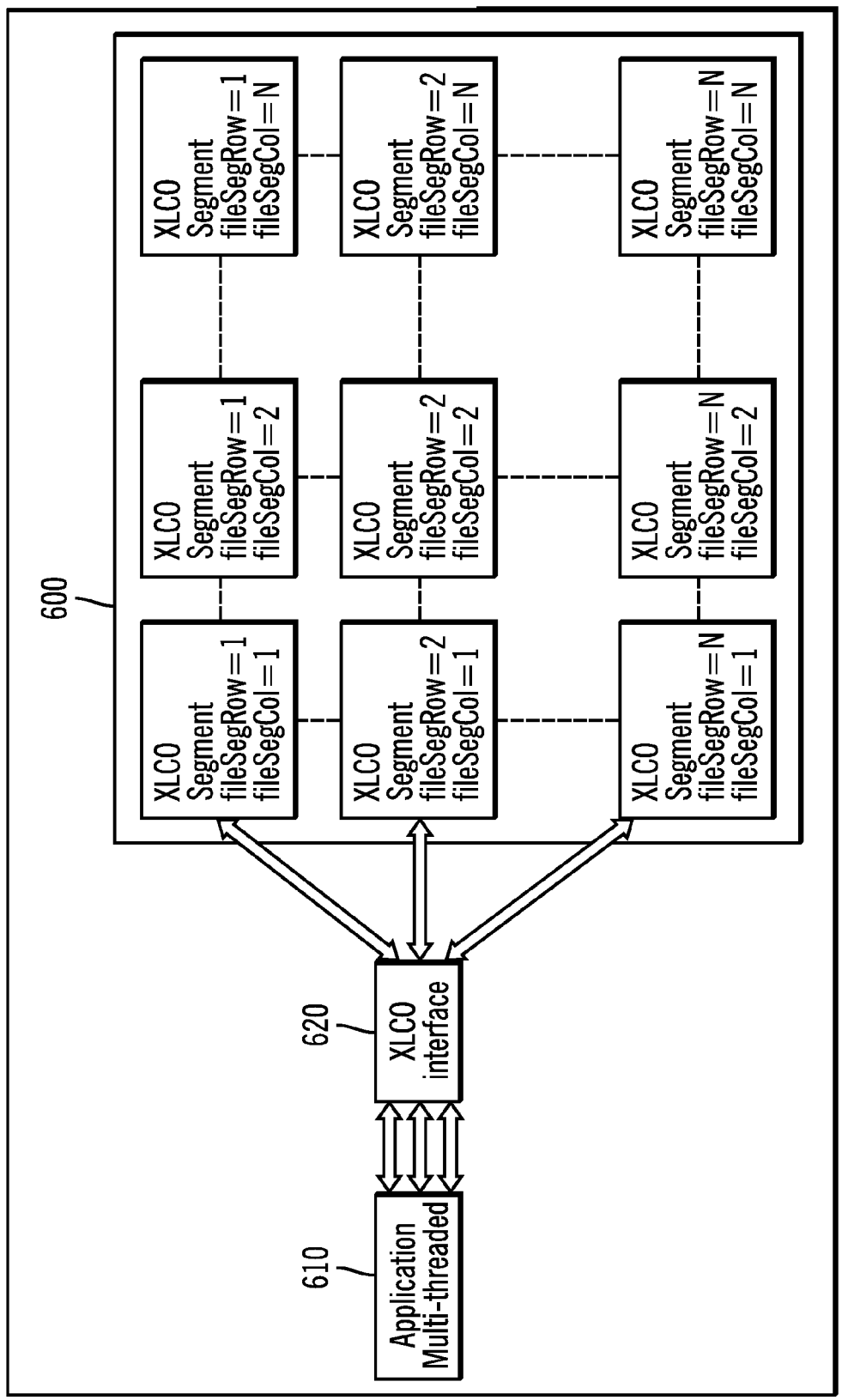
FIG. 6 illustrates, in a block diagram, a multithreaded application inserting data into multiple XLCO segments of an XLCO concurrently in accordance with certain embodiments.
Figure 7:
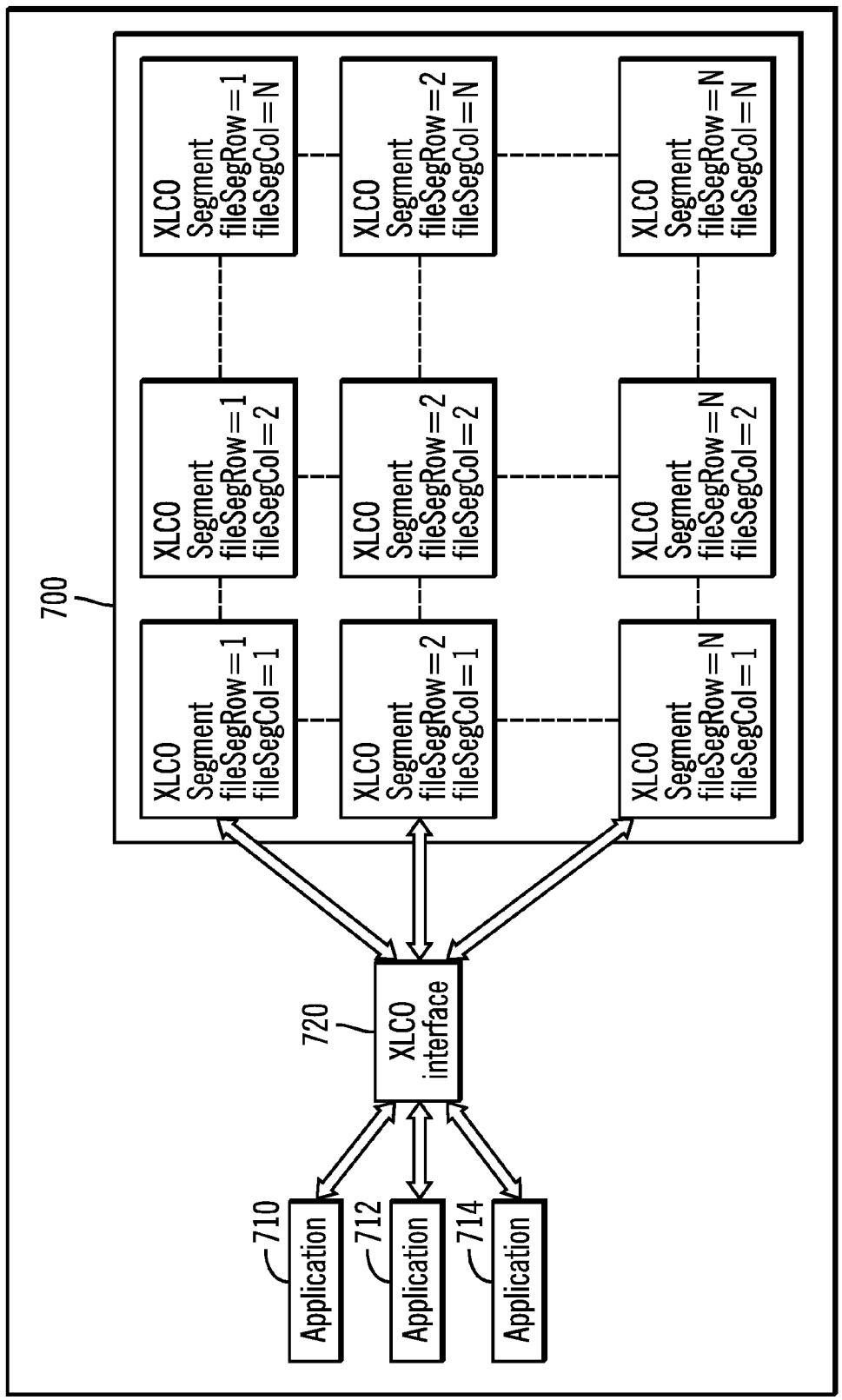
FIG. 7 illustrates, in a block diagram, multiple applications inserting data into multiple XLCO segments of an XLCO file concurrently in accordance with certain embodiments.

Thus, XLCO files that exceed the capacity of a single file system may be stored. The XLCO file does not depend on the computer system's ability to store large files. The XLCO file may be stored on multiple storage devices across multiple computer systems. The multiple computer systems may be running the same or different operating systems. Different XLCO segments may be processed separately by different applications (sequentially or in parallel, which is illustrated in FIG. 6 and FIG. 7). The XLCO file may be composed of data from different sources stored in different formats. The XLCO file may be accessed as a single object sequentially or as multiple individual objects in parallel, which is illustrated in FIG. 4 and FIG. 5. The XLCO file may be retrieved as a single data stream.

Figure 3:
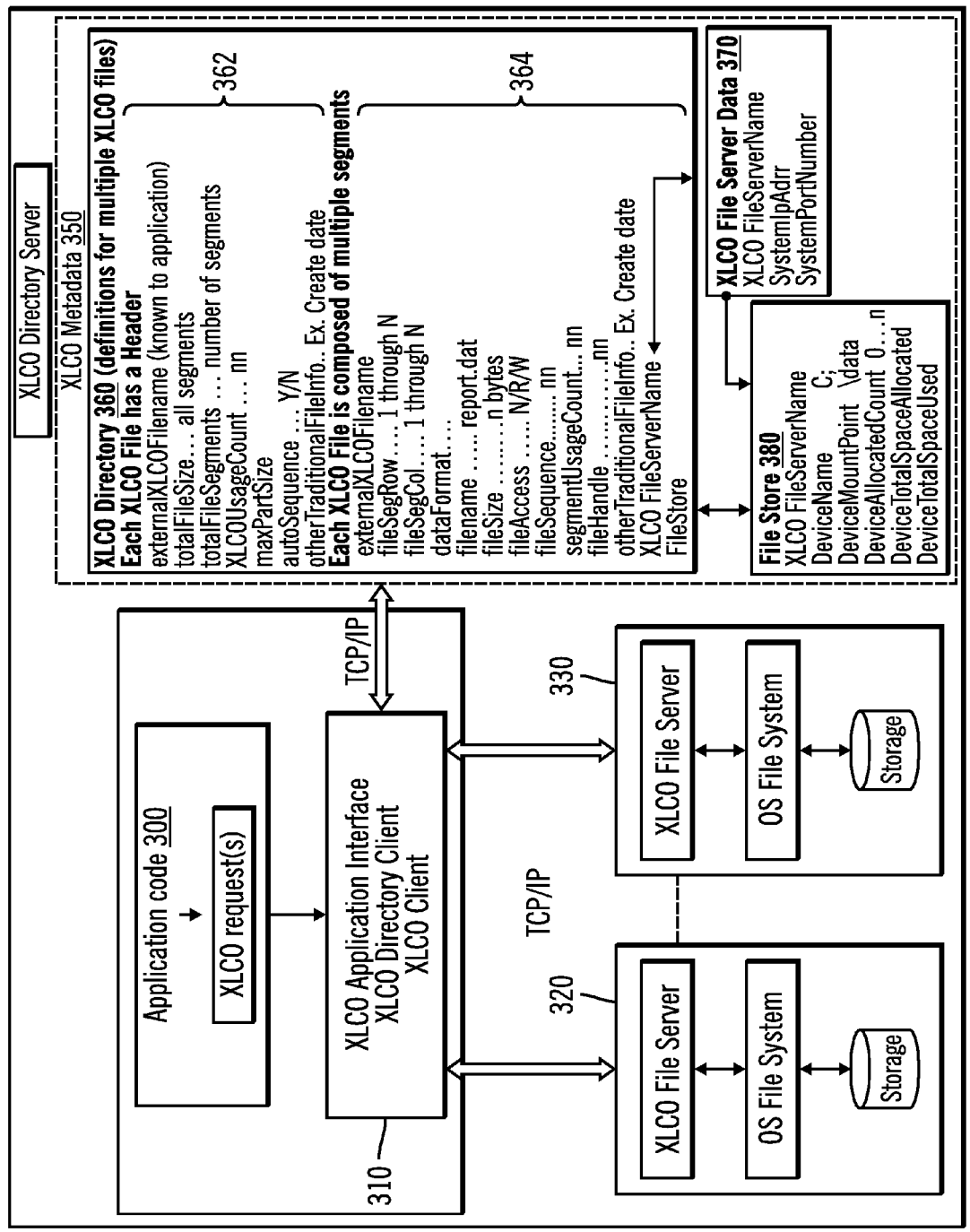
FIG. 3 illustrates, in a block diagram, functional details of an XLCO file system in accordance with certain embodiments.

FIG. 3 illustrates, in a block diagram, functional details of an XLCO file system in accordance with certain embodiments. Application code 300 includes one or more XLCO requests. Middleware code 310 includes the XLCO application interface, the XLCO directory client, and the XLCO client. The application code 300 and the middleware code 310 are coupled to metadata 350 via TCP/IP. The application code 300 and the middleware code 310 are coupled to computer systems 320, 330 via TCP/IP. Computer systems 320, 330 each include an XLCO file server, an OS file system, and storage.

As illustrated in FIG. 3, the XLCO subsystem is composed of the XLCO executable code (the XLCO application interface, the XLCO directory client, the XLCO directory server, the XLCO client, and the XLCO file server), as well as, the XLCO metadata 350 constructs (which are accessed and maintained via the XLCO directory server). The application code 300 wishing to make use of the XLCO subsystem does so by embedding the appropriate XLCO interface calls within the application code 300.

There are various embodiments for implementing the XLCO file system. Four embodiments are described here, but other embodiments are within the scope of the invention.

In a first embodiment, XLCO libraries are created as linkable object modules or dynamic load libraries (DLLs). These linkable object modules or DLLs reside along side their native counterparts. The application code is modified for files that want to use XLCO access. The application code is either linked or would make dynamic calls to the XLCO libraries.

In a second embodiment, a complete XLCO library is built and is embedded in the OS file system or the programming language runtime such that the XLCO library replaces all file I/O calls. The application code would thus be transparently linked into the XLCO libraries. Application code does not have to be specifically recompiled or linked so as to access the XLCO subsystem. The file size limitations would be transparent to the user and any file could be any size. In this second embodiment, the system libraries are replaced/enhanced to support XLCO files. The system administrator can configure XLCO support such that all files larger than a certain predetermined size become XLCO files and can be spread out over many file systems and/or many computer systems. The application code, therefore, does not need to be aware of anything and would work as designed, while some or all of the files accessed may be XLCO files. The new file I/O libraries can then automatically determine, based on the administrative settings, when to use XLCO files and where the file storage has been configured. Since there are no modifications to the existing application code, the application code is not aware of XLCO segments and, thus, XLCO segments are not used, and the XLCO file is seen by the application code as being a single XLCO file of "infinite" size.

In a third embodiment, the second embodiment is modified. In this third embodiment, both the "standard" file access interfaces and the XLCO file access interfaces are available to the application code. This allows the application code to make XLCO specific file access where needed (as opposed to "normal" file access). In this case, the application code can take advantage of the XLCO segments.

A fourth embodiment is a hybrid in which the system file I/O libraries are replaced and the XLCO libraries exist along side. This allows existing application code to use an XLCO file based on the administrator configuration without being aware of XLCO segments. However, if an application wants to leverage XLCO segments, the application code can be modified to use the new XLCO libraries.

Thus, FIG. 3 may vary based on whether the XLCO subsystem is implemented as object libraries, DLLs or is embedded in each operating system file system.

Typically, a small subset of the files that are used by an application are XLCO files. For example, in a movie house implementation, the digital movies may be XLCO files, while all the other files that are being used by the application may remain "normal" (i.e., non-XLCO) files. So, in the application code, there may be few occurrences of calls to XLCO files. However, it is possible to also make all the files XLCO files in various embodiments.

In the movie example, a movie may consist of a group of scenes, where each scene may be stored as a separate XLCO segment of the XLCO file. The scenes/XLCO segments may be stored when they are recorded (e.g., on different dates). A scene/XLCO segment may be re-enacted/replaced. When retrieving the movie data, data may be retrieved by starting at the beginning of the movie and retrieving bytes from there or, alternatively, by starting at the beginning of scene three (XLCO segment y) and retrieving bytes from there. Alternatively, for example, alternate/multiple "scene two's" may be created and, at retrieval time, one of the alternate "scene two" renditions may be replayed based on some form of viewer interaction. Thus, a single movie may appear differently to different viewers based on the viewer "interactions" with the movie.

With reference to FIG. 3, the application code 300 is linked with the XLCO application interface (using one of the four embodiments described above). The XLCO subsystem is composed of the XLCO application interface, the XLCO directory client, the XLCO directory server, the XLCO client, and the XLCO file server.

In certain embodiments, the XLCO application interface is installed on the same computer system as the application code 300 or is accessible through the disk subsystem (ex. Storage Area Network (SAN) or Network Attached Storage (NAS)).

In certain embodiments, the XLCO directory code accesses the XLCO metadata to determine where different XLCO segments are physically located. In certain embodiments, the XLCO directory code is implemented using client/server technology and includes the XLCO directory client and the XLCO directory server. This allows multiple applications to access the XLCO metadata from remote systems, simultaneously. In certain alternative embodiments in which multiple applications share disk access, then it is possible to implement the XLCO directory as a single module (bypassing the use of the client/server technology). In either case, the XLCO directory code allows for concurrent application access and implements appropriate record locking for the XLCO metadata 350.

In certain embodiments, the XLCO metadata 350 contains three sets of information, which may be maintained in either a database or a file storage mechanism. The three sets are a directory 360, XLCO file server data 370, and a file store 380. The XLCO directory 360 includes information needed to translate the XLCO "virtual file" into a series of physical files located on one or more computer systems. The XLCO directory 360 contains definitions for multiple XLCO files. For each XLCO file, the directory 360 includes a header information section 362 and one or more segment information sections 372. There is one segment information section for each XLCO segment. The XLCO file server data 370 contains a list of the physical computer systems on which XLCO file servers are running. The XLCO file store 380 contains a list of each of the file stores to be utilized for XLCO storage on the various XLCO file servers. Each XLCO file server contains one or more file stores (e.g., storage in computer systems 320, 330).

The XLCO directory server synchronizes multiple concurrent requests (from multiple application or threads) and ensures that only a single application or thread updates an XLCO segment at any one time. The XLCO client sends I/O requests to the XLCO file server using TCP/IP. The XLCO file server provides the interface/linkage to the computer system OS file system. The XLCO file server receives requests from the XLCO client, performs the required file access functionality through the underlying OS file system, and sends the results/data back to the XLCO client.

The native OS file system provides access to the locally stored files/XLCO segments.

Merely to enhance understanding, an example of an operational sequence is provided, as follows:

1. The application calls the XLCO openFile function.
2. The XLCO application interface passes the filename to the XLCO directory code. The XLCO directory code checks the XLCO metadata 350. If the filename exists, the XLCO directory code increments the XLCOUsageCount in the metadata 350 and returns an filename exists indication to the XLCO application interface. If the filename does not exist, the XLCO directory code returns an error code to the XLCO application interface. In either case, the XLCO application interface returns the indication or error code to the application.
3. The application requests a specific file function to be performed (e.g., readBytes) that specifies one or more XLCO segments (e.g., by specifying fileSegRow and fileSegCol).
4. The request is passed through the XLCO application interface to the XLCO directory code.
5. The XLCO directory code locates the appropriate "XLCO segment/real file" and checks the fileStatus byte. In particular, the XLCO directory code locates the XLCO segment based on 1) any passed in fileSegRow and fileSegCol values, 2) uses defaults if nothing is passed in, or 3) uses a file sequence number if defined and specified by the application.

If the fileStatus bytes is a "N" (not in use), the XLCO directory code updates the status to "R" (read) or "W" (write) based on the requested access, sets the segmentUsageCount value to 1, and sends a fileOpen request to the appropriate XLCO file server, which opens the file and returns the fileHandle. This opens the XLCO segment. If the XLCO file server fails to open the file, then fileStatus and partUsageCount are reverted to their original state and an error code is returned to the application.

If the fileStatus byte is an "R" and the request is for read, the XLCO directory code increments the partUsageCount and reads the fileHandle number. This allows multiple applications to access the same XLCO segment for read operations.

If the fileStatus byte is an "R" and the request is for write, a "busy" return code is sent to the application.

If the fileStatus byte is a "W" and the request is read or write, a "busy" return code is sent to the application.

If the fileHandle is returned (i.e., no busy or error code), the XLCO client passes the fileHandle, other file information, the startLocation, and the number of bytes to the appropriate XLCO file server.

6. The XLCO file server retrieves data from the local file system and sends the data back to the XLCO client, which in turn, returns the data to the application. When the application issues an XLCO closeFile request, the partUsageCount for the XLCO segment is decremented. If the partUsageCount reaches 0, then a XLCO closeFile request is sent to the XLCO file server, which closes the file on the local file system. Also, the FileAccess value is set to "N" and the fileHandle value is set to 0.

The XLCO directory structure allows for the creation of XLCO segments in a linear mode or a parallel mode.

In FIGS. 4-7, a single XLCO interface refers to one or more XLCO application interfaces, an XLCO directory client, and an XLCO client that are accessing a single XLCO directory server maintaining a single copy of the XLCO metadata. The XLCO segment data is accessed and/or modified through one or more XLCO file servers located on one or more computer systems.

FIG. 4 illustrates, in a block diagram, an XLCO 400 with a linear segment structure consisting of a single Row and multiple columns in accordance with certain embodiments. In FIG. 4, application 410 uses XLCO interface 420 to access the XLCO 400.

FIG. 4 illustrates XLCO segments created in a linear mode. The linear XLCO segment structure is useful when data is being stored and retrieved along a single timeline. For example, a movie, in which each segment represents a scene and the total movie is replayed by viewing the scenes in sequence, may be represented with a linear XLCO segment structure.

FIG. 5 illustrates, in a block diagram, an XLCO 500 with a parallelized segment structure consisting of a multiple Rows and multiple columns in accordance with certain embodiments. In FIG. 5, application 510 uses XLCO interface 520 to access the XLCO 500.

The parallel structure of FIG. 5 is useful when the data is coming from multiple sources at the same time. For example, video camera recording of traffic data may be represented with such a parallel structure. Each row may include data received from a specific video camera, while each column on the row may include a portion of data (e.g., 60 minutes of video data). So, for example, to retrieve data from the first two cameras (camera1 and camera2) that were recorded starting at 8:00, the files from row 1 (with data from camera1) and row 2 (with data from camera2), column 8 would be retrieved.

Applications that are aware of the XLCO segments can access the segments linearly (i.e., sequentially or randomly) using "fileSequence" values or non-linearly using "fileSegRow" (representing a row for a segment of an XLCO file) and "fileSegCol" (representing a column for a segment of an XLCO file) values. Segments may be assigned sequential numbers (e.g., as the segments are stored). These sequential numbers may later be re-arranged by an administrator or a program using the setFileSequence segment utility function (illustrated in FIG. 12).

Additionally, applications that are aware of the XLCO segments, may find it advantageous to the application if the application stored metadata about the XLCO segments in a searchable database designed to support the application. For the above traffic light example, columns in the external database may contain information, such as illustrated in the following Table A. This would allow the application to keep track of the fact that the video from camera n at time x is located in the specified fileSegRow and fileSegCol. The application would then make a call to the XLCO subsystem specifying the segment to be retrieved. This same table structure of Table A may be used to maintain application awareness as XLCO segments are added to the XLCO file.

TABLE A

| Camera | fileSegRow | fileSegCol | startTime |
|--------|------------|------------|-----------|
|        |            |            |           |

Data may be inserted into multiple XLCO segments at the same time by an application that is running multiple threads. Data may be inserted in parallel along each row, column by column. Also, data may be inserted into the complete array of XLCO segments in parallel. FIG. 6 illustrates, in a block diagram, a multithreaded application inserting data into multiple XLCO segments of an XLCO 600 concurrently in accordance with certain embodiments. In FIG. 6, the multiple threads of the application 610 each use a single XLCO interface 620 to access the XLCO 600.

FIG. 7 illustrates, in a block diagram, multiple applications inserting data into multiple XLCO segments of an XLCO file 700 concurrently in accordance with certain embodiments. In FIG. 7, each application 710, 712, 714 uses the single XLCO interface 720 to access the XLCO 700. Thus, the different applications 710, 712, 714 access a single set of XLCO metadata. The applications 710, 712, 714 and the XLCO interface 720 may reside on separate computer systems.

XLCO segmentation may be implemented in various ways in various embodiments. Herein, examples of XLCO segmentation are provided, but, other segmentation techniques are within the scope of the invention.

For example, more complex XLCO segment structures may be created by increasing the number of FileSegX definitions. As a specific example, a three-dimensional FileSeg may be defined to allow for the storage of spatial data, where the three dimensions may be the traditional axes X, Y, Z. Also, a fourth dimension t (time) may also be added.

Also, if the problem is one of file size, then the application code may not be aware of the XLCO segments and can continue to access data to the limit determined by the offset and number of bytes to return values.

In certain embodiments, Table B is used to determine how to distribute data among the XLCO segments. Such embodiments use Time and Information coupling strength as the criteria for XLCO segment data distribution.

TABLE B

|                           | Loose time Coupling | Tight time Coupling |
|---------------------------|---------------------|---------------------|
| Loose information coupling | Medical Records     | News Feeds          |
| Tight information coupling | Movies              | Traffic Monitoring  |

In Table B, medical records are created over a long time horizon (a lifetime) and the retrieval of one or more records is independent of the retrieval of the other records (where a record may be an xRay, medical report or some other piece of data). News feeds are created at the same time (events of the day), but are not necessarily related (the price of rice in China vs. an earthquake in Chile). As for movies, movie segments are filmed at different times, but viewing the movie typically involves viewing all the segments in sequence. With traffic monitoring, data from multiple cameras is collected at the same time, when viewing the data one may want to view a single camera data stream at a time or one may want to view a person moving through the various camera data streams through time.

Embodiments provide functions (i.e., also referred to as methods or interfaces) to access and operate an XLCO file structure. Such functions may also be described as XLCO requests. In various embodiments, the exact interface content and syntax may vary based on the specific XLCO implementation and the information stored in the metadata. FIGS. 8, 9, 10, 11, and 12 illustrate sample functions in accordance with certain embodiments. In various embodiments, additional functionality may be added on top of the illustrated functions.

Figure 8:
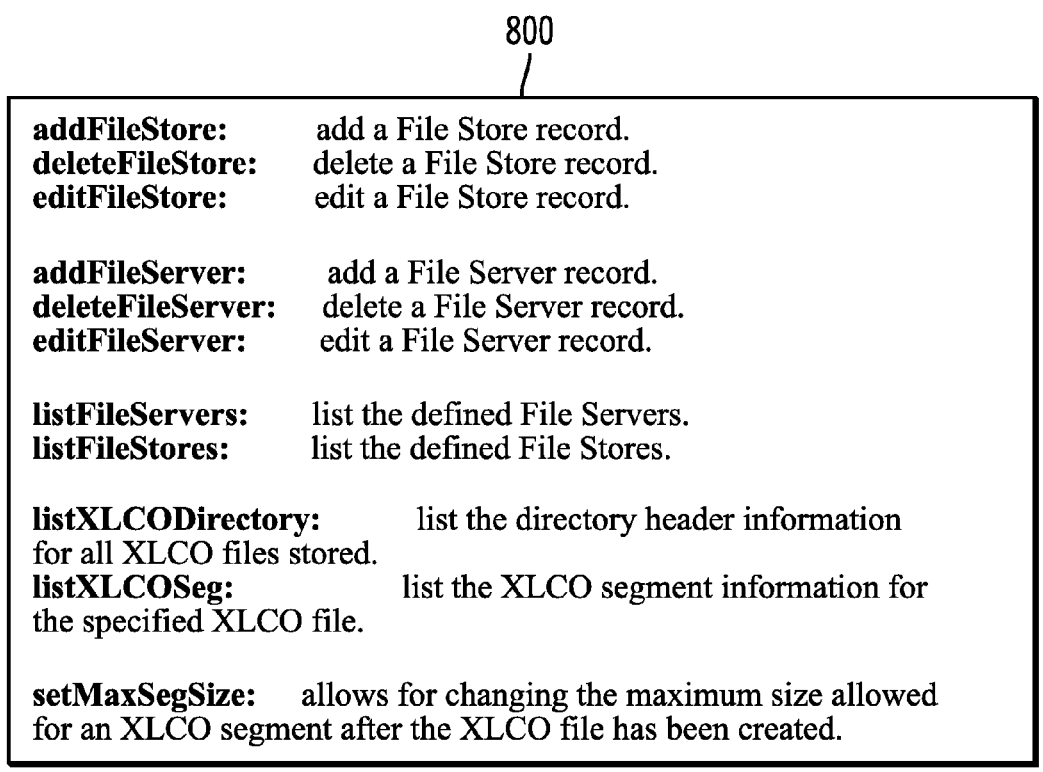
FIG. 8 illustrates XLCO metadata administration utility functions in accordance with certain embodiments.

FIG. 8 illustrates XLCO metadata administration utility functions 800 in accordance with certain embodiments. The utility functions 800 allow for the administration and control of the XLCO metadata.

FIG. 9 illustrates XLCO file level access functions 900 in accordance with certain embodiment. The XLCO file level access functions 900 deal with XLCO file level operations, such as opening, closing and deleting XLCO files. Multiple applications may open (and access) the same XLCO file concurrently. Whenever an application/thread opens an XLCO file, the XLCOUsageCount is incremented in the metadata for that XLCO file. When the application/thread closes the XLCO file, the XLCOUsageCount is decremented in the metadata for that XLCO file. Also, functions, such as deleteFile or renameFile, return an error code unless there is a single application/thread accessing the XLCO file as indicated by the XLCOUsageCount in the metadata for that XLCO file.

FIG. 10 illustrates sequential XLCO segment access functions 1000, 1010 in accordance with certain embodiments. FIG. 10 is formed by FIGS. 10A and 10B. The functions 1000, 1010 illustrated in FIG. 10 allow an application/thread to transparently, sequentially access the XLCO segments.

FIG. 11 illustrates direct XLCO segment access functions 1100 in accordance with certain embodiments. These functions 1100 allow an application/thread to directly access an XLCO segment. The application/thread provides either:

the specified fileSegRow, fileSegCol values, or the fileSequence number.

In FIG. 11, the "S" at the end of a function (e.g., readByteS, writeByteS, appendByteS, deleteByteS) indicates that this function accesses the XLCO segment by specifying the XLCO segment fileSequence. The "P" at the end of a function (e.g., readByteP, writeByteP, appendByteP, deleteByteP) indicates that this function accesses the XLCO segment by the XLCO segment location within the XLCO structure by specifying the fileSegRow and fileSegCol. In FIG. 11, each function specifies the XLCO segment to be accessed.

FIG. 12 illustrates XLCO segment utility functions 1200 in accordance with certain embodiments. The XLCO segment utility functions 1200 allow for the creation, deletion and manipulation of the XLCO segments.

Figure 13:
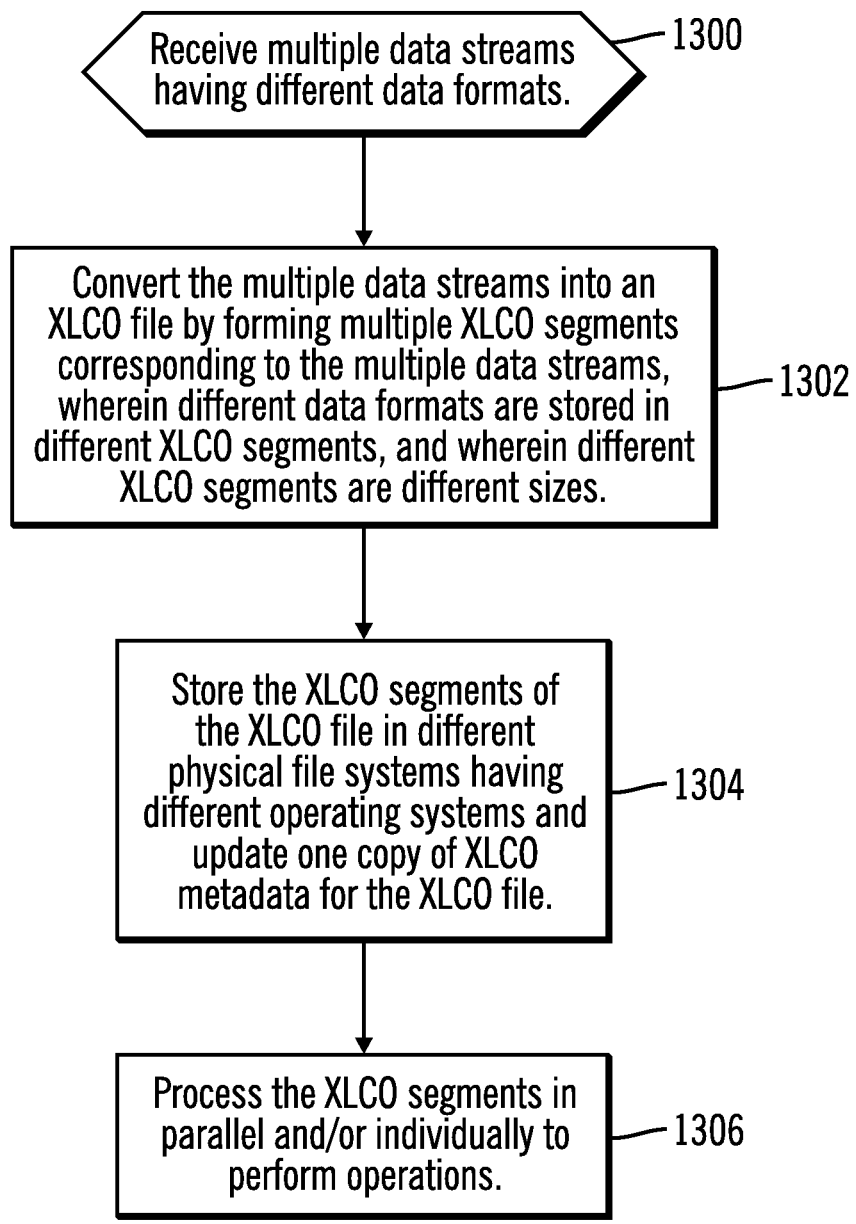
FIG. 13 illustrates, in a flow diagram, logic performed by an XLCO interface for processing of an XLCO file in accordance with certain embodiments.

FIG. 13 illustrates, in a flow diagram, logic performed by the XLCO interface 202 for processing of an XLCO file in accordance with certain embodiments. Control begins at block 1300 with the XLCO interface 202 receiving multiple data streams having different data formats. For example, one data stream may be a video stream (e.g., a movie), and another data stream may be an audio stream (e.g., a song). In certain embodiments, one or more of the multiple data streams may be "live" or in "real time" (i.e., is being recorded and sent to the XLCO interface 202 in real time). In certain embodiments, one or more of the multiple data streams may be received as files, with each file storing only one data format (e.g., a word processing document or a spreadsheet document). In block 1302, the XLCO interface 202 converts the multiple data streams into an XLCO file by forming multiple XLCO segments corresponding to the multiple data streams, wherein different data formats are stored in different XLCO segments, and wherein different XLCO segments are different sizes. That is, each of the multiple data streams, having different data formats, becomes an XLCO segment in the XLCO file. In block 1304, XLCO interface 202 stores the XLCO segments in the XLCO file in different physical file systems having different operating systems and update one copy of the XLCO metadata for the XLCO file. That is, in certain embodiments, there is one copy of the XLCO metadata 350 for all XLCO files. The newly created XLCO file has a header information section 362 and a segment information section 364 for each XLCO segment. In block 1306, XLCO interface 202 processes the XLCO segments in parallel and/or individually to perform operations. FIGS. 8-12 illustrate some of the operations that may be performed. For example, the operations may include appending an XLCO segment to the XLCO file, inserting an XLCO segment into the XLCO file, deleting an XLCO segment from the XLCO file, and physically and/or logically linking XLCO segments. Also, the operations may include reading bytes from an XLCO segment, writing bytes to an XLCO segment, appending bytes to an XLCO segment, and deleting bytes from an XLCO segment.

Thus, the XLCO file system allows storing file content across multiple file systems, while making that content appear as one large file to an application (i.e., a virtual file). The XLCO file may be comprised of multiple XLCO segments that can be stored in parallel (independently of each other). The XLCO file may be stored on multiple connected systems (running different operating systems). The XLCO file system allows deleting part of the XLCO file, inserting into the XLCO file, physically and/or logically linking XLCO segments, performing parallel data storage, and appending to the XLCO file.

The XLCO file system provides the ability to create and manipulate files that are virtually unlimited in size, physically spanning potentially many computers and storage subsystems. The XLCO file system provides the ability to create files containing an arbitrary N-dimensional branching structure of XLCO segments. An XLCO segment is identified by a row and column value. These XLCO segments can be created or processed in parallel by different threads or even separate processes/applications, again potentially running on multiple computer systems. Moreover, each row and column of the XLCO file structure may be of varying length. Also, each XLCO segment may be of varying length.

The XLCO file system provides the ability to manipulate the XLCO segment structure of an XLCO file. For example, an XLCO segment or portion of an XLCO segment may be inserted into an existing XLCO file (e.g., by an editor). This is useful especially when files are extremely large because it obviates the need to copy the existing data in order to perform the insertion. Instead, only the inserted data is written to storage, along with updates to the XLCO file metadata. As another example, an XLCO segment or a portion of an XLCO segment may be deleted (e.g., a sequence of bytes are deleted out of the middle of an existing XLCO file), updating the XLCO file metadata and releasing the bytes from the underlying XLCO file (with, if needed, support within the operating system if copying of one or more XLCO segments is to be avoided).

The XLCO file system provides the ability to distribute portions of a large file across multiple storage frames or computers and allows multiple threads or processes to process XLCO segments independently and/or in parallel.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 14:
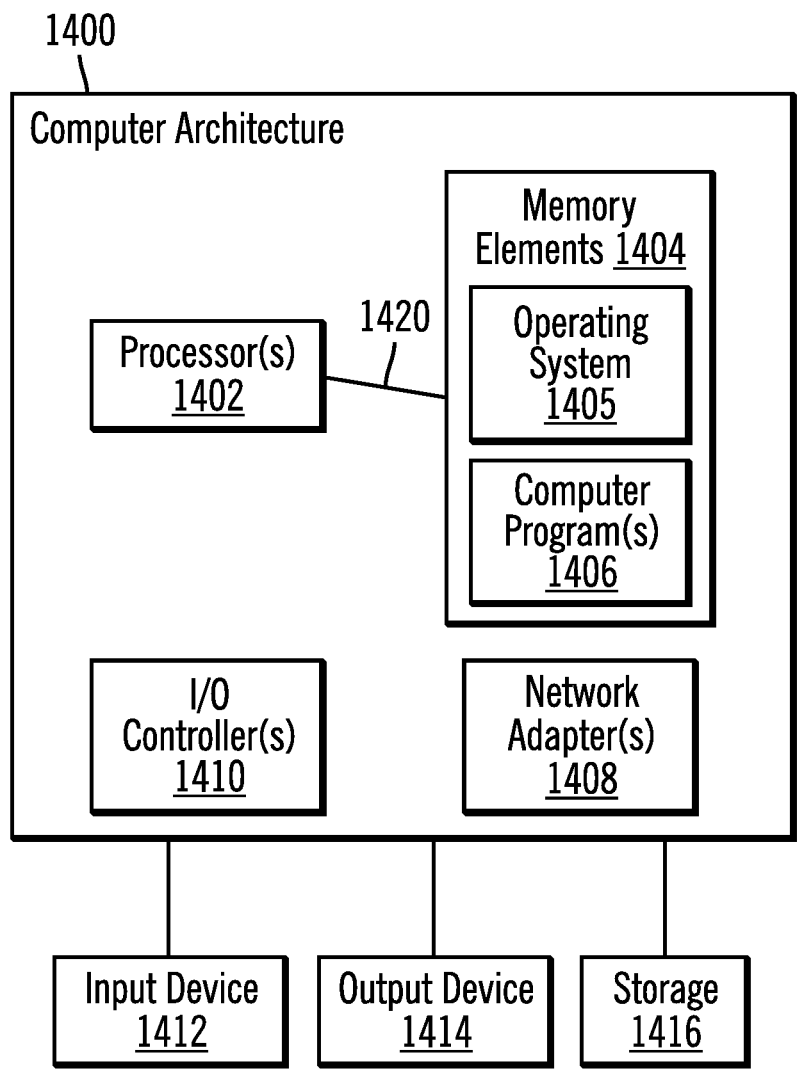
FIG. 14 illustrates a computer architecture that may be used in accordance with certain embodiments.

FIG. 14 illustrates a computer architecture 1400 that may be used in accordance with certain embodiments. Any of the computer systems mentioned herein (e.g., computer systems 220, 230, 32, 330) may implement computer architecture 1400. The computer architecture 1400 is suitable for storing and/or executing program code and includes at least one processor 1402 coupled directly or indirectly to memory elements 1404 through a system bus 1420. The memory elements 1404 may include local memory employed during actual execution of the program code, bulk storage, and cache memories which provide temporary storage of at least some program code in order to reduce the number of times code must be retrieved from bulk storage during execution. The memory elements 1404 include an operating system 1405 and one or more computer programs 1406.

Input/Output (I/O) devices 1412, 1414 (including but not limited to keyboards, displays, pointing devices, etc.) may be coupled to the system either directly or through intervening I/O controllers 1410.

Network adapters 1408 may also be coupled to the system to enable the data processing system to become coupled to other data processing systems or remote printers or storage devices through intervening private or public networks. Modems, cable modem and Ethernet cards are just a few of the currently available types of network adapters 1408.

The computer architecture 1400 may be coupled to storage 1416 (e.g., a non-volatile storage area, such as magnetic disk drives, optical disk drives, a tape drive, etc.). The storage 1416 may comprise an internal storage device or an attached or network accessible storage. Computer programs 1406 in storage 1416 may be loaded into the memory elements 1404 and executed by a processor 1402 in a manner known in the art.

The computer architecture 1400 may include fewer components than illustrated, additional components not illustrated herein, or some combination of the components illustrated and additional components. The computer architecture 1400 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
converting, using a computer including a processor, data streams having different data formats into Extremely Large Complex Object (XLCO) segments that form a file;
storing the file by:
    storing a first XLCO segment of the XLCO segments in a first physical file system accessed with a first operating system with the first XLCO segment identified by a first value in an XLCO segment structure; and
    storing a second XLCO segment of the XLCO segments in a second physical file system accessed with a second operating system with the second XLCO segment identified by a second value in the XLCO segment structure;
    in response to receiving an XLCO request to access the first XLCO segment that specifies the first value, mapping the XLCO request to an operating system request for access by the first operating system of the first physical file system; and
    in response to receiving an XLCO request to access the second XLCO segment that specifies the second value, mapping the XLCO request to an operating system request for access by the second operating system of the second physical file system.

2. The method of claim 1, further comprising:
updating XLCO metadata, wherein the XLCO metadata includes a header section and a segment section for each of the XLCO segments.

3. The method of claim 1, further comprising:
using XLCO metadata to retrieve one or more of the XLCO segments.

4. The method of claim 1, further comprising:
processing different XLCO segments in parallel using different processors.

5. The method of claim 1, further comprising:
processing different XLCO segments individually using different processors.

6. The method of claim 1, further comprising:
performing one of appending an XLCO segment to an XLCO file, inserting an XLCO segment into the XLCO file, deleting an XLCO segment from the XLCO file, physically linking XLCO segments in the XLCO file, and logically linking XLCO segments in the XLCO file.

7. The method of claim 1, further comprising:
performing one of reading bytes from an XLCO segment, writing bytes to an XLCO segment, appending bytes to an XLCO segment, and deleting bytes from an XLCO segment.

8. The method of claim 1, further comprising:
using an N-dimensional XLCO segment structure having rows and columns, wherein an XLCO segment is identified by a row and column value.

9. A system, comprising:
a processor; and
storage coupled to the processor, wherein the storage has stored thereon a computer program, and wherein the processor executes the computer program to perform operations, the operations comprising:
    converting data streams having different data formats into Extremely Large Complex Object (XLCO) segments that form a file;
    storing the file by:
        storing a first XLCO segment of the XLCO segments in a first physical file system accessed with a first operating system with the first XLCO segment identified by a first value in an XLCO segment structure; and
        storing a second XLCO segment of the XLCO segments in a second physical file system accessed with a second operating system with the second XLCO segment identified by a second value in the XLCO segment structure;
    in response to receiving an XLCO request to access the first XLCO segment that specifies the first value, mapping the XLCO request to an operating system request for access by the first operating system of the first physical file system; and
    in response to receiving an XLCO request to access the second XLCO segment that specifies the second value, mapping the XLCO request to an operating system request for access by the second operating system of the second physical file system.

10. The system of claim 9, wherein the operations further comprise:
    updating XLCO metadata, wherein the XLCO metadata includes a header section and a segment section for each of the XLCO segments.

11. The system of claim 9, wherein the operations further comprise:
    using XLCO metadata to retrieve one or more of the XLCO segments.

12. The system of claim 9, wherein the operations further comprise:
    processing different XLCO segments in parallel using different processors.

13. The system of claim 9, wherein the operations further comprise:
    processing different XLCO segments individually using different processors.

14. The system of claim 9, wherein the operations further comprise:
    performing one of appending an XLCO segment to an XLCO file, inserting an XLCO segment into the XLCO file, deleting an XLCO segment from the XLCO file, physically linking XLCO segments in the XLCO file, and logically linking XLCO segments in the XLCO file.

15. The system of claim 9, wherein the operations further comprise:
    performing one of reading bytes from an XLCO segment, writing bytes to an XLCO segment, appending bytes to an XLCO segment, and deleting bytes from an XLCO segment.

16. The system of claim 9, wherein the operations further comprise:
    using an N-dimensional XLCO segment structure having rows and columns, wherein an XLCO segment is identified by a row and column value.

17. A computer program product comprising a non-transitory computer readable storage medium including a computer readable program, wherein the computer readable program when executed by a processor on a computer causes the computer to perform:
    converting data streams having different data formats into Extremely Large Complex Object (XLCO) segments that form a file;
    storing the file by:
        storing a first XLCO segment of the XLCO segments in a first physical file system accessed with a first operating system with the first XLCO segment identified by a first value in an XLCO segment structure; and
        storing a second XLCO segment of the XLCO segments in a second physical file system accessed with a second operating system with the second XLCO segment identified by a second value in the XLCO segment structure;
    in response to receiving an XLCO request to access the first XLCO segment that specifies the first value, mapping the XLCO request to an operating system request for access by the first operating system of the first physical file system; and
    in response to receiving an XLCO request to access the second XLCO segment that specifies the second value, mapping the XLCO request to an operating system request for access by the second operating system of the second physical file system.

18. The computer program product of claim 17, wherein the computer readable program when executed by the processor on the computer causes the computer to perform:
    updating XLCO metadata, wherein the XLCO metadata includes a header section and a segment section for each of the XLCO segments.

19. The computer program product of claim 17, wherein the computer readable program when executed by the processor on the computer causes the computer to perform:
    using XLCO metadata to retrieve one or more of the XLCO segments.

20. The computer program product of claim 17, wherein the computer readable program when executed by the processor on the computer causes the computer to perform:
    processing different XLCO segments in parallel using different processors.

21. The computer program product of claim 17, wherein the computer readable program when executed by the processor on the computer causes the computer to perform:
    processing different XLCO segments individually using different processors.

22. The computer program product of claim 17, wherein the computer readable program when executed by the processor on the computer causes the computer to perform:
    performing one of appending an XLCO segment to an XLCO file, inserting an XLCO segment into the XLCO file, deleting an XLCO segment from the XLCO file, physically linking XLCO segments in the XLCO file, and logically linking XLCO segments in the XLCO file.

23. The computer program product of claim 17, wherein the computer readable program when executed by the processor on the computer causes the computer to perform:
    performing one of reading bytes from an XLCO segment, writing bytes to an XLCO segment, appending bytes to an XLCO segment, and deleting bytes from an XLCO segment.

24. The computer program product of claim 17, wherein the computer readable program when executed by the processor on the computer causes the computer to perform:
    using an N-dimensional XLCO segment structure having rows and columns, wherein an XLCO segment is identified by a row and column value.

\* \* \* \* \*